United States Patent
Wu

(10) Patent No.: US 9,493,596 B2
(45) Date of Patent: Nov. 15, 2016

(54) VINYL ACETATE CROTONIC ACID INTERMEDIATE TRANSFER MEMBERS

(71) Applicant: Xerox Corporation, Norwalk, CT (US)

(72) Inventor: Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 306 days.

(21) Appl. No.: 14/251,578

(22) Filed: Apr. 12, 2014

(65) Prior Publication Data

US 2015/0291715 A1    Oct. 15, 2015

(51) Int. Cl.
*C08F 218/08* (2006.01)
*H01B 1/04* (2006.01)

(52) U.S. Cl.
CPC ............... *C08F 218/08* (2013.01); *H01B 1/04* (2013.01)

(58) Field of Classification Search
CPC .................................. H01B 1/04; C08L 1/00
USPC ........................................................ 252/502
See application file for complete search history.

(56) References Cited

U.S. PATENT DOCUMENTS

| | | | |
|---|---|---|---|
| 4,869,984 A | * | 9/1989 | Kung ................... G03G 5/0618 430/58.35 |
| 6,139,784 A | | 10/2000 | Oshima et al. |
| 6,322,940 B1 | * | 11/2001 | Nishigaki ............. G03G 5/047 430/58.05 |
| 7,130,569 B2 | | 10/2006 | Goodman et al. |
| 7,139,519 B2 | | 11/2006 | Darcy, III et al. |
| 2002/0081508 A1 | * | 6/2002 | Horiuchi ............. C09B 67/0026 430/59.5 |
| 2003/0152855 A1 | * | 8/2003 | Drappel ................. G03G 5/142 430/60 |
| 2005/0014080 A1 | * | 1/2005 | Tong ..................... G03G 5/047 430/58.8 |
| 2006/0105253 A1 | * | 5/2006 | Wu ....................... G03G 5/0542 430/59.1 |
| 2007/0178312 A1 | | 8/2007 | Miura et al. |
| 2013/0299751 A1 | * | 11/2013 | Wu ........................... C08L 79/08 252/510 |
| 2014/0218875 A1 | * | 8/2014 | Nakayama .......... C08G 73/1021 361/751 |

\* cited by examiner

*Primary Examiner* — William Young
(74) *Attorney, Agent, or Firm* — Eugene O. Palazzo

(57) ABSTRACT

An intermediate transfer member that includes a mixture of a polymer, a vinyl acetate crotonic acid copolymer, an optional conductive component, an optional fluoropolymer, and an optional polysiloxane.

20 Claims, 1 Drawing Sheet

VINYL ACETATE CROTONIC ACID INTERMEDIATE TRANSFER MEMBERS

This disclosure is generally directed to an intermediate transfer member that includes a vinyl acetate crotonic acid copolymer, and an intermediate transfer member that comprises a mixture of a polyimide, a vinyl acetate crotonic acid copolymer, an optional fluoropolymer, an optional polysiloxane, and an optional conductive component.

BACKGROUND

Intermediate transfer members, such as intermediate transfer belts selected for transferring a developed image in xerographic systems, are known. For example, there are known intermediate transfer members that include materials with characteristics that cause these members to become brittle, resulting in inadequate acceptance of the developed image, and subsequent partial transfer of developed xerographic images to a substrate like paper.

A disadvantage relating to the preparation of an intermediate transfer member is that there is usually deposited a separate release layer on a metal substrate, and thereafter there is applied to the release layer the intermediate transfer member components or composition, and where the release layer allows the components to be separated from the member by peeling or by the use of mechanical devices. Thereafter, the intermediate transfer member components are in the form of a film, which can be selected for xerographic imaging systems, or the film can be deposited on a supporting substrate like a polymer layer. The use of an intermediate release layer adds to the cost and time of preparation, and such a layer can modify a number of the intermediate transfer member characteristics.

Intermediate transfer members that include certain additives, such as for example liquid phosphate esters, have a tendency to decompose, especially at temperatures where curing is accomplished, and where the decomposition generates coating defects and permits undesirable liquids to be present.

Intermediate transfer members that enable acceptable registration of the final color toner image in xerographic color systems using synchronous development of one or more component colors, and using one or more transfer stations, are known. However, a disadvantage of using an intermediate transfer member in color systems is that a plurality of developed toner transfer operations is utilized, thus sometimes causing charge exchange between the toner particles and the transfer member, which ultimately can result in less than complete toner transfer. This can result in low resolution images on the image receiving substrate like paper, and image deterioration. When the image is in color, an image can additionally suffer from color shifting and color deterioration.

There is a need for intermediate transfer members that substantially avoid or minimize the disadvantages of a number of known intermediate transfer members.

Also, there is a need for intermediate transfer members with excellent thermal stability, surface coating uniformity, and acceptable mechanical and electrical properties.

Further, there is a need for intermediate transfer members and compositions thereof with excellent wear characteristics and acceptable abrasion resistance, and which members possess improved stability with no or minimal degradation, or decomposition for extended time periods.

Moreover, there is a need for intermediate transfer member materials with an absence of coating defects and that possess self release characteristics from a number of substrates that are selected when such members are prepared.

Another need relates to intermediate transfer members that have excellent conductivity or resistivity, and that possess acceptable humidity insensitivity characteristics leading to developed images with minimal resolution issues.

Yet additionally, there is a need for intermediate transfer members that can be economically and efficiently manufactured.

These and other needs are achievable in embodiments with the intermediate transfer members and compositions or components thereof disclosed herein.

SUMMARY

Disclosed is an intermediate transfer member comprising a vinyl acetate crotonic acid copolymer.

Also disclosed is an intermediate transfer member comprising a mixture of a polyimide, a vinyl acetate crotonic acid copolymer, a carbon black conductive component, and a fluoropolymer, and wherein the vinyl acetate crotonic acid copolymer is represented by the following formula/structure

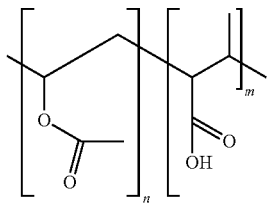

wherein n is from about 70 to about 99.9 mol percent, m is from about 0.1 to about 30 mol percent, and where the total thereof is about 100 mol percent.

Further disclosed is an intermediate transfer member comprising a mixture of a polyimide or a polyamic acid that converts to a polyimide, a vinyl acetate crotonic acid copolymer, carbon black and a fluoropolymer, and wherein the vinyl acetate crotonic acid copolymer possesses a weight average molecular weight of from about 20,000 to about 300,000, and a number average molecular weight of from about 5,000 to about 200,000, and wherein the polyimide is selected from the group consisting of at least one of

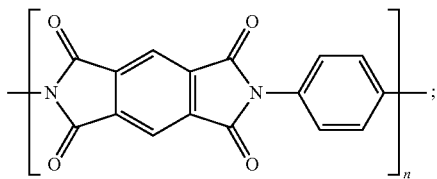

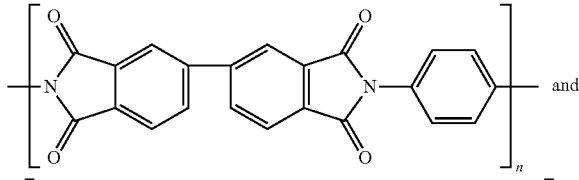

and

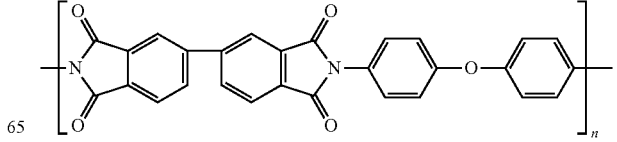

where n represents the number of repeating segments of from about 5 to about 3,000.

FIGURES

The following Figures are provided to further illustrate the intermediate transfer members disclosed herein.

EMBODIMENTS

There is provided herein an intermediate transfer member comprising a mixture in, for example, the configuration of a layer that generally comprises a polymer, such as a polyimide and other suitable effective polymers like polycarbonates, polystyrenes, mixtures thereof and the like, a vinyl acetate crotonic acid copolymer that primarily functions as an internal release agent, an optional fluoropolymer, an optional polysiloxane polymer, and an optional conductive component like carbon black, and which member has excellent release and stability characteristics, smooth high quality surfaces, and improved mechanical properties.

Figure 1:
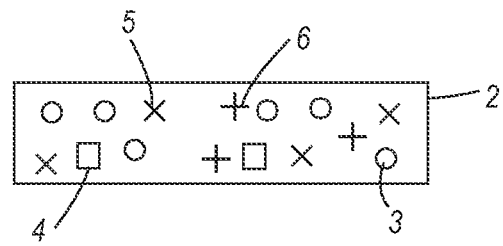
FIG. 1 illustrates an exemplary embodiment of a one-layer intermediate transfer member of the present disclosure.

In FIG. 1 there is illustrated an intermediate transfer member comprising a layer 2 comprised of a vinyl acetate crotonic acid copolymer 4, or a mixture of a polymer, such as a polyimide 3, a vinyl acetate crotonic acid copolymer 4, an optional fluoropolymer, an optional siloxane polymer, or mixtures thereof 5, and an optional conductive component 6.

Figure 2:
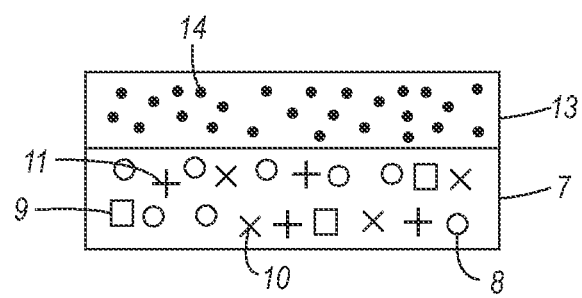
FIG. 2 illustrates an exemplary embodiment of a two-layer intermediate transfer member of the present disclosure.

In FIG. 2 there is illustrated a two-layer intermediate transfer member comprising a bottom layer 7 comprising a vinyl acetate crotonic acid copolymer 9, or a mixture of a polymer, such as a polyimide 8, a vinyl acetate crotonic acid copolymer 9, an optional fluoropolymer, an optional siloxane polymer, or mixtures thereof 10, and an optional conductive component 11, and an optional top or outer toner release layer 13 comprising release components 14.

Figure 3:
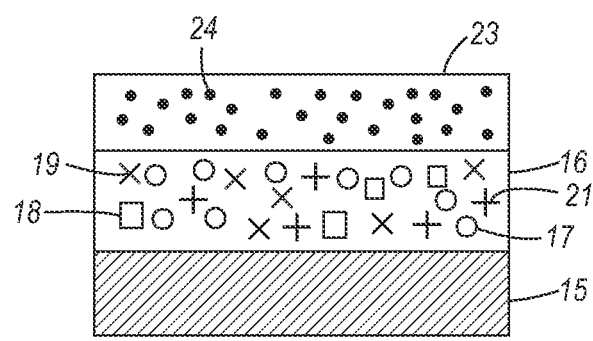
FIG. 3 illustrates an exemplary embodiment of a three-layer intermediate transfer member of the present disclosure.

In FIG. 3 there is illustrated a three layer intermediate transfer member comprising a supporting substrate 15, a layer thereover 16 comprising a vinyl acetate crotonic acid copolymer 18, or a mixture of a polymer, such as a thermosetting polyimide 17, a vinyl acetate crotonic acid copolymer 18, an optional fluoropolymer, an optional siloxane polymer, or mixtures thereof 19, and an optional conductive component 21, and an optional release layer 23 comprising release components 24.

The intermediate transfer members disclosed herein exhibit self release characteristics, and where the use of an external release layer present on, for example, a stainless steel substrate is avoided; have excellent mechanical strength while permitting the rapid and complete transfer from about 90 to about 99 percent, and from about 95 to about 100 percent transfer of a xerographic developed image; possess a Young's modulus of, for example, from about 5,000 to about 10,000 Mega Pascals, (MPa), from about 4,000 to about 10,000 MPa, from about 7,000 to about 9,000 MPa, from about 7,500 to about 8,500 MPa, from about 5,500 to about 9,500 MPa, and from about 8,500 to about 8,700 MPa; an excellent break strength of, for example, from about 175 to about 250 Mega Pascals (MPa), from about 200 to about 240 MPa, from about 200 to about 225 MPa, from about 200 to about 210 MPa, from about 100 to about 300 MPa, and from about 175 to about 255 MPa; a high glass transition temperature ($T_g$) of from about 200° C. to about 400° C., or from about 250° C. to about 375° C.; a CTE (coefficient of thermal expansion) of from about 20 to about 70 ppm/° K, or from about 30 to about 60 ppm/° K; and an excellent resistivity as measured with a known High Resistivity Meter of, for example, from about $10^8$ to about $10^{13}$ ohm/square, from about $10^9$ to about $10^{13}$ ohm/square, from about $10^9$ to about $10^{12}$ ohm/square, and from about $10^{10}$ to about $10^{12}$ ohm/square.

Self-release characteristics without the assistance of any external sources, such as prying devices, permit the efficient, economical formation, and full separation, from about 95 to about 100 percent, and from about 97 to about 99 percent of the disclosed intermediate transfer members from substrates, such as steel, upon which the members are initially prepared in the form of a film, and where release materials and separate release layers can be avoided on the metal substrates. The time period to obtain the self-release characteristics varies depending, for example, on the components selected for the vinyl acetate crotonic acid copolymer containing mixtures disclosed. Generally, however, this time period is from about 1 to about 60 seconds, from about 1 to about 35 seconds, from about 1 to about 10 seconds, and from 1 to about 5 seconds, and in some instances less than about 1 second.

The intermediate transfer members of the present disclosure can be provided in any of a variety of configurations, such as a one-layer configuration, or in a multi-layer configuration including, for example, a top release layer. More specifically, the final intermediate transfer member may be in the form of an endless flexible belt, a web, a flexible drum or roller, a rigid roller or cylinder, a sheet, a drelt (a cross between a drum and a belt), a seamless belt that is with an absence of any seams or visible joints in the members, and the like.

Vinyl Acetate Crotonic Acid Copolymers

The vinyl acetate crotonic acid copolymers incorporated into the disclosed intermediate transfer member mixtures impart self-release characteristics to the mixtures. As such, when the intermediate transfer member is prepared or formed on an underlying substrate, the intermediate transfer member can self-release from the substrate.

Examples of vinylacetate/crotonic acid copolymers selected for the intermediate transfer member mixtures illustrated herein are represented by the following formula/structure

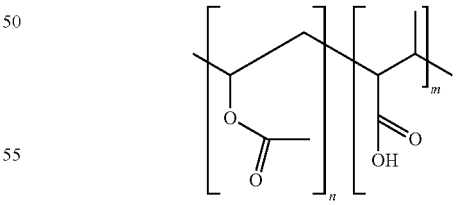

wherein m and n represent the number of repeating segments with values for n being, for example, from about 70 to about 99.9 mol percent, from about 90 to about 99 mol percent, from about 80 to about 99.5 mol percent, and from about 85 to about 95 mol percent; and m being, for example, from about 0.1 to about 30 mol percent, from about 0.5 to about 20 mol percent, from about 1 to about 10 mol percent, and from about 5 to about 15 mol percent, and wherein the total thereof is about 100 mol percent. Other suitable examples of n and m, such as m being from about 65 to about 75 mol percent, and n being from about 25 to about 35 mol percent, and wherein the total thereof is about 100 mol percent, are also envisioned for the vinylacetate/crotonic acid copolymers.

The weight average and number average molecular weights of the vinylacetate/crotonic acid copolymers can vary, depending for example, on the values of n and m. Molecular weight examples for the vinylacetate/crotonic acid copolymers are a reported weight average molecular weight $M_w$ of from about 20,000 to about 300,000, from about 75,000 to about 150,000, and from about 45,000 to about 130,000, and a number average molecular weight $M_n$ of from about 5,000 to about 200,000 and from about 25,000 to about 100,000, and is determined by Gel Permeation Chromatography (GPC) analysis.

Vinylacetate/crotonic acid copolymers selected for the intermediate transfer members illustrated herein, and available from Wacker Polymers, include VINNAPAS® C305 with an acid number equal to from about 30 to about 38 milligrams KOH/gram and a weight average molecular weight of about 45,000; C341 with an acid number equal to from about 6 to about 8 milligrams KOH/gram and a weight average molecular weight of about 60,000; and C501 with an acid number of from about 5.5 to about 7 milligrams KOH/gram and a weight average molecular weight of about 130,000, mixtures thereof, and the like.

The vinylacetate/crotonic acid copolymers can be present in the intermediate transfer member mixture in an amount of, for example, from about 0.1 to about 15 weight percent, from about 0.1 to about 10 weight percent, from about 1 to about 7 weight percent, from about 1 to about 5 weight percent, from about 1 to about 3 weight percent, from about 0.9 to about 3 weight percent, from about 1 to about 1.5 weight percent, and from about 0.5 to about 5 weight percent, based on solids, such as the coating mixture of a polyamic acid or a polyimide polymer, the vinyl acetate crotonic acid copolymer, the fluoropolymer when present, the polysiloxane polymer when present, and when present the conductive component.

Polymers

The disclosed intermediate transfer members contain a suitable polymer, such as a polyimide or a component such as a polyamic acid that converts to a polyimide upon curing by heating.

Examples of the polyimides selected for the illustrated herein intermediate transfer include known low temperature, and rapidly cured polyimide polymers, such as VTEC™ PI 1388, 080-051, 851, 302, 203, 201, and PETI-5, all available from Richard Blaine International, Incorporated, Reading, Pa. These thermosetting polyimides can be cured at temperatures of from about 180° C. to about 260° C. over a short period of time, such as from about 10 to about 120 minutes, or from about 20 to about 60 minutes, and generally have a number average molecular weight of from about 5,000 to about 500,000 or from about 10,000 to about 100,000, and a weight average molecular weight of from about 50,000 to about 5,000,000 or from about 100,000 to about 1,000,000 as determined by Gel Permeation Chromatography, (GPC), analysis. Also, for the intermediate transfer mixture there can be selected thermosetting polyimides that can be cured at temperatures above 300° C., such as PYRE M.L.® RC-5019, RC 5057, RC-5069, RC-5097, RC-5083, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJI-FILM Electronic Materials U.S.A., Inc., North Kingstown, R.I., and KAPTON® HN, VN and FN, all commercially available from E.I. DuPont, Wilmington, Del.

Additionally, suitable polyimides that may be selected for the disclosed intermediate transfer members are known polyimides, such as thermosetting polyimides, formed from the imidization by heating and curing of a polyamic acid, or a polyimide precursor. Examples of these polyimides include the imidization of at least one of a polyamic acid of pyromellitic dianhydride/4,4'-oxydianiline, a polyamic acid of pyromellitic dianhydride/phenylenediamine, a polyamic acid of biphenyl tetracarboxylic dianhydride/4,4'-oxydianiline, a polyamic acid of biphenyl tetracarboxylic dianhydride/phenylenediamine, a polyamic acid of benzophenone tetracarboxylic dianhydride/4,4'-oxydianiline, a polyamic acid of benzophenone tetracarboxylic dianhydride/4,4'-oxydianiline/phenylenediamine, and the like, and mixtures thereof. The heating and curing may be at temperatures that are suitable to cause the imidization of the polyamic acid, which temperature is believed to be from about 75° C. to about 325° C., 235° C. to about 340° C., from about 260° C. to about 325° C., from about 275° C. to about 300° C., from about 260° C. to about 325° C., and from about 260° C. to about 325° C., and more specifically, curing in sequence at temperatures at about 75° C., about 190° C., and then at about 320° C., and subsequently cooling to about room temperature of, for example, from about 23° C. to about 25° C.

Commercially available examples of polyamic acids included in the disclosed coating mixtures are pyromellitic dianhydride/4,4-oxydianilines like PYRE-ML® RC5019 (about 15 to about 16 weight percent in N-methyl-2-pyrrolidone, NMP), RC5057 (about 14.5 to about 15.5 weight percent in NMP/aromatic hydrocarbon, ratio of 80/20), and RC5083 (about 18 to about 19 weight percent in NMP/DMAc, ratio of 15/85), all obtainable from Industrial Summit Technology Corporation, Parlin, N.J.; and DURIMIDE® 100, commercially available from FUJIFILM Electronic Materials U.S.A., Inc.

Examples of polyamic acids of biphenyl tetracarboxylic dianhydride/4,4'-oxydianilines that may be selected for the generation of the polyimides for the disclosed intermediate transfer members include U-VARNISH A, and VARNISH S (about 20 weight in NMP), both available from UBE America Inc., New York, N.Y. or from Kaneka Corp., Texas. Polyamic acids of biphenyl tetracarboxylic dianhydride/phenylenediamine examples include PI-2610 (about 10.5 weight in NMP), and PI-2611 (about 13.5 weight in NMP), both available from HD MicroSystems, Parlin, N.J.

Further examples of polyimides that may be selected for the disclosed intermediate transfer member mixtures can be obtained from the curing at temperatures of from about 75° C. to about 325° C. of polyamic acids of benzophenone tetracarboxylic dianhydride/4,4'-oxydianilines, such as RP46 and RP50 (about 18 weight percent in NMP), both available from Unitech Corp., Hampton, Va. Commercially obtainable from HD MicroSystems, Parlin, N.J., examples of polyamic acids of benzophenone tetracarboxylic dianhydride/4,4'-oxydianiline/phenylenediamines that can be selected are PI-2525 (about 25 weight percent in NMP), PI-2574 (about 25 weight percent in NMP), PI-2555 (about 19 weight percent in NMP/aromatic hydrocarbon, ratio of 80/20), and PI-2556 (about 15 weight percent in a mixture of NMP solvent/aromatic hydrocarbon/propylene glycol methyl ether, ratio of 70/15/15).

Examples of polyamic acids or esters of polyamic acid that can be imidized by curing can be generated by the reaction of a dianhydride and a diamine. Suitable dianhydrides selected for the reaction include aromatic dianhydrides and aromatic tetracarboxylic acid dianhydrides, such as, for example, 9,9-bis(trifluoromethyl)xanthene-2,3,6,7-tetracarboxylic acid dianhydride, 2,2-bis(3,4-dicarboxyphenyl)hexafluoropropane dianhydride, 2,2-bis(3,4-dicarboxyphenoxy phenyl)hexafluoropropane dianhydride, 4,4'-bis(3,4-dicarboxy-2,5,6-trifluorophenoxy)octafluorobiphenyl dianhydride, 3,3',4,4'-tetracarboxybiphenyl dianhydride, 3,3',4,4'-tetracarboxybenzophenone dianhydride, di-(4-(3,4-dicarboxyphenoxyl)phenyl)ether dianhydride, di-(4-(3,4-dicarboxyphenoxyl)phenyl) sulfide dianhydride, di-(3,4-dicarboxyphenyl)methane dianhydride, di-(3,4-dicarboxyphenyl) ether dianhydride, 1,2,4,5-tetracarboxybenzene dianhydride, 1,2,4-tricarboxybenzene dianhydride, butanetetracarboxylic dianhydride, cyclopentanetetracarboxylic dianhydride, pyromellitic dianhydride, 1,2,3,4-benzenetetracarboxylic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracene tetracarboxylic dianhydride, 1,2,7,8-phenanthrenetetracarboxylic dianhydride, 3,3',4,4'-biphenyltetracarboxylic dianhydride, 2,2',3,3'-biphenyltetracarboxylic dianhydride, 3,3',4-4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(2,3-dicarboxyphenyl)ether dianhydride, bis(3,4-dicarboxyphenyl)sulfone dianhydride, bis(2,3-dicarboxyphenyl)sulfone 2,2-bis(3,4-dicarboxyphenyl)-1,1,1,3,3,3-hexafluoropropane dianhydride, 2,2-bis(3,4-dicarboxyphenyl)-1,1,1,3,3,3-hexachloropropane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, 4,4'-(p-phenylenedioxy)diphthalic dianhydride, 4,4'-(m-phenylenedioxy)diphthalic dianhydride, 4,4'-diphenylsulfidedioxybis(4-phthalic acid)dianhydride, 4,4'-diphenylsulfonedioxybis(4-phthalic acid)dianhydride, methylenebis(4-phenyleneoxy-4-phthalic acid)dianhydride, ethylidenebis(4-phenyleneoxy-4-phthalic acid)dianhydride, isopropylidenebis-(4-phenyleneoxy-4-phthalic acid)dianhydride, hexafluoroisopropylidenebis(4-phenyleneoxy-4-phthalic acid)dianhydride, and the like.

Exemplary diamines selected for the reaction with the dianhydrides include 4,4'-bis-(m-aminophenoxy)-biphenyl, 4,4'-bis-(m-aminophenoxy)-diphenyl sulfide, 4,4'-bis-(m-aminophenoxy)-diphenyl sulfone, 4,4'-bis-(p-aminophenoxy)-benzophenone, 4,4'-bis-(p-aminophenoxy)-diphenyl sulfide, 4,4'-bis-(p-aminophenoxy)-diphenyl sulfone, 4,4'-diamino-azobenzene, 4,4'-diaminobiphenyl, 4,4'-diaminodiphenylsulfone, 4,4'-diamino-p-terphenyl, 1,3-bis-(gamma-aminopropyl)-tetramethyl-disiloxane, 1,6-diaminohexane, 4,4'-diaminodiphenylmethane, 3,3'-diaminodiphenylmethane, 1,3-diaminobenzene, 4,4'-diaminodiphenyl ether, 2,4'-diaminodiphenylether, 3,3'-diaminodiphenylether, 3,4'-diaminodiphenylether, 1,4-diaminobenzene, 4,4'-diamino-2,2',3,3',5,5',6,6'-octafluoro-biphenyl, 4,4'-diamino-2,2',3,3',5,5',6,6'-octafluorodiphenyl ether, bis[4-(3-aminophenoxy)-phenyl]sulfide, bis[4-(3-aminophenoxyl)phenyl]sulfone, bis[4-(3-aminophenoxy)phenyl]ketone, 4,4'-bis(3-aminophenoxy)biphenyl, 2,2-bis[4-(3-aminophenoxyl)phenyl]-propane, 2,2-bis[4-(3-aminophenoxyl)phenyl]-1,1,1,3,3,3-hexafluoropropane, 4,4'-diaminodiphenyl sulfide, 4,4'-diaminodiphenyl ether, 4,4'-diaminodiphenyl sulfone, 4,4'-diaminodiphenylmethane, 1,1-di(p-aminophenyl)ethane, 2,2-di(p-aminophenyl)propane, 2,2-di(p-aminophenyl)-1,1,1,3,3,3-hexafluoropropane, and the like, and mixtures thereof.

The dianhydride and diamine reactants can be selected in various suitable amounts, such as, for example, a weight ratio of dianhydride to diamine of from about 20/80 to about 80/20, from about 40/60 to about 60/40, and from about 50/50.

The polyimide, or precursor thereof, can be present in the intermediate transfer member mixture in the ratios as illustrated herein, and in various effective amounts, such as for example, from about 70 to about 97 weight percent, from about 70 to about 95 weight percent, from about 75 to about 95 weight percent, or from about 80 to about 90 weight percent, based on the weight of solids or components present in the coating mixture, such as a coating mixture of a polyamic acid or a polyimide polymer, a vinyl acetate crotonic acid copolymer, a fluoropolymer, an optional polysiloxane polymer when present, and a conductive component.

Polyimide examples can be selected from the group consisting of at least one of

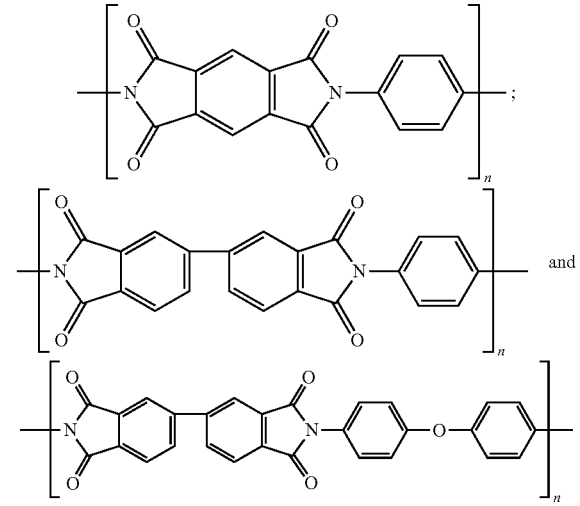

where n represents the number of repeating segments of from about 5 to about 3,000, from about 1,000 to about 1,500, from about 100 to about 700, and from about 20 to about 200.

Optional Fluoropolymers

Examples of fluoropolymers selected for the compositions and intermediate transfer members of the preset disclosure, and which function primarily as a leveling additive to assist in providing smooth member surfaces, include for example, NOVEC® FC-4432, NOVEC® FC-4430 and NOVEC® FC-4434, all available from 3M Company, and where NOVEC® is a registered trademark of the 3M Company, and other suitable polyacrylates, and fluoroacrylate copolymers, such as poly[2-methyl((nonafluorobutyl)sulphonyl)amino ethyl acrylate], and mixtures thereof.

The fluoropolymer, or copolymers thereof can be present in the intermediate transfer member mixture in various effective amounts, such as from about 0.01 to about 5 weight percent, from about 0.05 to about 3 weight percent, from about 0.05 to about 1 weight percent, from about 0.05 to about 0.5 weight percent, from about 0.1 to about 3 weight percent, from about 0.2 to about 1 weight percent, and from about 0.1 to about 0.2 weight percent based on the solids or the weight of components present in the mixture, such as of the mixture of the polyimide polymer, the vinyl acetate crotonic acid copolymer, and when present the fluoropolymer, the polysiloxane polymer, and the conductive component.

Optional Polysiloxane Polymers

The intermediate transfer member mixture can also comprise a polysiloxane polymer. Examples of polysiloxane polymers selected for the intermediate transfer member mixture disclosed herein include known suitable polysiloxanes, such as a polyether modified polydimethylsiloxane, commercially available from BYK Chemical as BYK® 333, BYK® 330 (about 51 weight percent in methoxypropylacetate), and BYK® 344 (about 52.3 weight percent in xylene/isobutanol, ratio of 80/20); BYK®-SILCLEAN 3710 and BYK® 3720 (about 25 weight percent in methoxypropanol); a polyester modified polydimethylsiloxane, commercially available from BYK Chemical as BYK® 310 (about 25 weight percent in xylene) and BYK® 370 (about 25 weight percent in xylene/alkylbenzenes/cyclohexanone/monophenylglycol, ratio of 75/11/7/7); a polyacrylate modified polydimethylsiloxane, commercially available from BYK Chemical as BYK®-SILCLEAN 3700 (about 25 weight percent in methoxypropylacetate); a polyester polyether modified polydimethylsiloxane, commercially available from BYK Chemical as BYK® 375 (about 25 weight percent in di-propylene glycol monomethyl ether); and the like, and mixtures thereof.

The polysiloxane polymer, or copolymers thereof can be present in the intermediate transfer member mixture in various effective amounts, such as from about 0.01 to about 1 weight percent, from about 0.05 to about 1 weight percent, from about 0.05 to about 0.5 weight percent, or from about 0.1 to about 0.3 weight percent based on the weight of components present in the mixture, or solids, such as the mixture of the polyimide polymer, the vinyl acetate crotonic acid copolymer, the fluoropolymer when present, the polysiloxane when present, and when present the conductive component.

The fluoropolymers and polysiloxanes primarily function as leveling additives, or leveling agents, which can contribute to the intermediate member smoothness characteristics, such as enabling smooth coating surfaces with minimal or no blemishes or protrusions, and enhanced chemical and thermal stability.

Optional Conductive Components

Optionally, the intermediate transfer member may contain one or more conductive additives to, for example, alter and adjust the conductivity of the intermediate transfer member. Where the intermediate transfer member is a one layer structure, the conductive component can be included in the vinyl acetate crotonic acid copolymer containing mixture disclosed herein. However, where the intermediate transfer member is a multi-layer structure, the conductive component can be included in one or more layers of the member, such as in the supporting substrate, the polymer mixture layer coated thereon, and in both the supporting substrate and the polymer mixture layer.

Many suitable conductive components can be used that provide the desired results. For example, suitable conductive components include carbon blacks, metal oxides, polyanilines, other known suitable conductive components, and mixtures thereof.

Examples of carbon black conductive components that can be selected for the intermediate transfer members illustrated herein include special black 4 (B.E.T. surface area=180 m$^2$/g, DBP absorption=1.8 ml/g, primary particle diameter=25 nanometers) available from Evonik-Degussa, special black 5 (B.E.T. surface area=240 m$^2$/g, DBP absorption=1.41 ml/g, primary particle diameter=20 nanometers), color black FW1 (B.E.T. surface area=320 m$^2$/g, DBP absorption=2.89 ml/g, primary particle diameter=13 nanometers), color black FW2 (B.E.T. surface area=460 m$^2$/g, DBP absorption=4.82 ml/g, primary particle diameter=13 nanometers), color black FW200 (B.E.T. surface area=460 m$^2$/g, DBP absorption=4.6 ml/g, primary particle diameter=13 nanometers), all available from Evonik-Degussa; VULCAN® carbon blacks, REGAL® carbon blacks, MONARCH® carbon blacks, and BLACK PEARLS® carbon blacks available from Cabot Corporation. Specific examples of conductive carbon blacks are BLACK PEARLS 1000 (B.E.T. surface area=343 m$^2$/g, DBP absorption=1.05 ml/g), BLACK PEARLS 880 (B.E.T. surface area=240 m$^2$/g, DBP absorption=1.06 ml/g), BLACK PEARLS® 800 (B.E.T. surface area=230 m$^2$/g, DBP absorption=0.68 ml/g), BLACK PEARLS® L (B.E.T. surface area=138 m$^2$/g, DBP absorption=0.61 ml/g), BLACK PEARLS® 570 (B.E.T. surface area=110 m$^2$/g, DBP absorption=1.14 ml/g), BLACK PEARLS® 170 (B.E.T. surface area=35 m$^2$/g, DBP absorption=1.22 ml/g), VULCAN® XC72 (B.E.T. surface area=254 m$^2$/g, DBP absorption=1.76 ml/g), VULCAN® XC72R (fluffy form of VULCAN® XC72), VULCAN® XC605, VULCAN® XC305, REGAL 660 (B.E.T. surface area=112 m$^2$/g, DBP absorption=0.59 ml/g), REGAL 400 (B.E.T. surface area=96 m$^2$/g, DBP absorption=0.69 ml/g), REGAL® 330 (B.E.T. surface area=94 m$^2$/g, DBP absorption=0.71 ml/g), MONARCH® 880 (B.E.T. surface area=220 m$^2$/g, DBP absorption=1.05 ml/g, primary particle diameter=16 nanometers), and MONARCH® 1000 (B.E.T. surface area=343 m$^2$/g, DBP absorption=1.05 ml/g, primary particle diameter=16 nanometers); and Channel carbon blacks available from Evonik-Degussa. Other known suitable carbon blacks not specifically disclosed herein may be selected as the filler or conductive component for the intermediate transfer members disclosed herein.

Examples of polyaniline conductive components that can be selected for incorporation into the disclosed intermediate transfer members are PANIPOL™ F, commercially available from Panipol Oy, Finland, and known lignosulfonic acid grafted polyanilines. These polyanilines usually have a relatively small particle size diameter of, for example, from about 0.5 to about 5 microns; from about 1.1 to about 2.3 microns, or from about 1.5 to about 1.9 microns.

Metal oxide conductive components that can be selected for the disclosed intermediate transfer members include, for example, tin oxide, antimony doped tin oxide, indium oxide, indium tin oxide, zinc oxide, and titanium oxide, mixtures thereof, and the like.

When present, the conductive component can be selected in an amount of, for example, from about 1 to about 60 weight percent, from about 3 to about 40 weight percent, from about 4 to about 30 weight percent, from about 10 to about 30 percent, from about 11 to about 25 weight percent, and from about 5 to about 20 weight percent based on total solids.

Various weight ratios of the polyamic acid/carbon black/vinyl acetate/crotonic acid copolymer/fluoropolymer can be selected, such as about 87.7/11/1.1/0.2, about 85/13.7/1.1/0.2, about 90/8/1.5/0.5, about 91/7/1.5/0.5, about 81/17/1.3/0.7, other ratios based on the weight percents of the component mixtures disclosed herein, and the like.

Optional Additional Polymers

In embodiments of the present disclosure, the intermediate transfer member mixture can further include an optional polymer that primarily functions as a binder. Examples of suitable additional polymers include a polyamideimide, a polycarbonate, a polyphenylene sulfide, a polyamide, a polysulfone, a polyetherimide, a polyester, a polyvinylidene fluoride, a polyethylene-co-polytetrafluoroethylene, and the like, and mixtures thereof.

When an additional polymer is selected, it can be included in the intermediate transfer members mixture in any desirable and effective amounts. For example, the polymer can be present in an amount of from about 1 to about 75 weight percent, from about 2 to about 45 weight percent, or from about 3 to about 15 weight percent, based on a total weight of the mixture components.

Optional Supporting Substrates

If desired, a supporting substrate can be included in the intermediate transfer member, such as beneath the vinyl acetate crotonic acid copolymer containing polymer mixture layer subsequent to its release from a metal substrate. The supporting substrate can be included to provide increased rigidity or strength to the intermediate transfer member.

The coating dispersion of the disclosed vinyl acetate crotonic acid copolymer containing mixture can be coated on various suitable supporting substrates to form a dual layer intermediate transfer member. Exemplary supporting substrate materials include polyimides, polyamideimides, polyetherimides, mixtures thereof, and the like.

More specifically, examples of the intermediate transfer member supporting substrates are polyimides inclusive of known low temperature, and rapidly cured polyimide polymers, such as VTEC™ PI 1388, 080-051, 851, 302, 203, 201, and PETI-5, all available from Richard Blaine International, Incorporated, Reading, Pa., polyamideimides, polyetherimides, and the like The thermosetting polyimides can be cured at temperatures of from about 180° C. to about 260° C. over a period of time, such as from about 10 to about 120 minutes, or from about 20 or about 30 to about 60 minutes, and generally have a number average molecular weight of from about 5,000 to about 500,000 or from about 10,000 to about 100,000, and a weight average molecular weight of from about 50,000 to about 5,000,000 or from about 100,000 to about 1,000,000. Also, for the supporting substrate there can be selected thermosetting polyimides that can be cured at temperatures of above 300° C., such as PYRE M.L.® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.; and KAPTON® HN, VN and FN, all commercially available from E.I. DuPont, Wilmington, Del.

Examples of polyamideimides that can be selected as supporting substrates for the intermediate transfer members disclosed herein are VYLOMAX® HR-11NN (15 weight percent solution in N-methylpyrrolidone, $T_g=300°$ C., and $M_w=45,000$), HR-12N2 (30 weight percent solution in N-methylpyrrolidone/xylene/methyl ethyl ketone=50/35/15, $T_g=255°$ C., and $M_w=8,000$), HR-13NX (30 weight percent solution in N-methylpyrrolidone/xylene=67/33, $T_g=280°$ C., and $M_w=10,000$), HR-15ET (25 weight percent solution in ethanol/toluene=50/50, $T_g=260°$ C., and $M_w=10,000$), HR-16NN (14 weight percent solution in N-methylpyrrolidone, $T_g=320°$ C., and $M_w=100,000$), all commercially available from Toyobo Company of Japan, and TORLON® AI-10 ($T_g=272°$ C.), commercially available from Solvay Advanced Polymers, LLC, Alpharetta, Ga.

Examples of specific polyetherimide supporting substrates that can be selected for the intermediate transfer members disclosed herein are ULTEM® 1000 ($T_g=210°$ C.), 1010 ($T_g=217°$ C.), 1100 ($T_g=217°$ C.), 1285, 2100 ($T_g=217°$ C.), 2200 ($T_g=217°$ C.), 2210 ($T_g=217°$ C.), 2212 ($T_g=217°$ C.), 2300 ($T_g=217°$ C.), 2310 ($T_g=217°$ C.), 2312 ($T_g=217°$ C.), 2313 ($T_g=217°$ C.), 2400 ($T_g=217°$ C.), 2410 ($T_g=217°$ C.), 3451 ($T_g=217°$ C.), 3452 ($T_g=217°$ C.), 4000 ($T_g=217°$ C.), 4001 ($T_g=217°$ C.), 4002 ($T_g=217°$ C.), 4211 ($T_g=217°$ C.), 8015, 9011 ($T_g=217°$ C.), 9075, and 9076, all commercially available from Sabic Innovative Plastics.

Once formed, the supporting substrate can have any desired and suitable thickness. For example, the supporting substrate can have a thickness of from about 10 to about 300 microns, from about 50 to about 150 microns, from about 75 to about 125 microns, and from about 50 to about 75 microns.

Optional Release Layer

An optional release layer can be included in the intermediate transfer member, such as over the vinyl acetate crotonic acid copolymer layer mixture illustrated herein. The release layer can be included to assist in providing toner cleaning and additional developed image transfer efficiency from a photoconductor to the intermediate transfer member.

When selected, the release layer can have any desired and suitable thickness. For example, the release layer can have a thickness of from about 1 to about 100 microns, about 10 to about 75 microns, or from about 20 to about 50 microns.

The optional release layer can comprise TEFLON®-like materials including fluorinated ethylene propylene copolymer (FEP), polytetrafluoroethylene (PTFE), polyfluoroalkoxy polytetrafluoroethylene (PFA TEFLON®), and other TEFLON®-like materials; silicone materials, such as fluorosilicones and silicone rubbers, such as Silicone Rubber 552, available from Sampson Coatings, Richmond, Va., (polydimethyl siloxane/dibutyl tin diacetate, 0.45 gram DBTDA per 100 grams polydimethyl siloxane rubber mixture, with a molecular weight $M_w$ of approximately 3,500); and fluoroelastomers, such as those sold as VITON®, such as copolymers and terpolymers of vinylidenefluoride, hexafluoropropylene, and tetrafluoroethylene, which are known commercially under various designations as VITON A®, VITON E®, VITON E60C®, VITON E45®, VITON E430®, VITON B910®, VITON GH®, VITON B50®, and VITON GF®. The VITON® designation is a Trademark of E.I. DuPont de Nemours, Inc. Two known fluoroelastomers are comprised of (1) a class of copolymers of vinylidenefluoride, hexafluoropropylene, and tetrafluoroethylene, known commercially as VITON A®; (2) a class of terpolymers of vinylidenefluoride, hexafluoropropylene, and tetrafluoroethylene, known commercially as VITON B®; and (3) a class of tetrapolymers of vinylidenefluoride, hexafluoropropylene, tetrafluoroethylene, and a cure site monomer, such as VITON GF®, having 35 mole percent of vinylidenefluoride, 34 mole percent of hexafluoropropylene, and 29 mole percent of tetrafluoroethylene with 2 percent cure site monomer. The cure site monomers can be those available from E.I. DuPont de Nemours, Inc. such as 4-bromoperfluorobutene-1,1,1-dihydro-4-bromoperfluorobutene-1,3-bromoperfluoropropene-1,1,1-dihydro-3-bromoperfluoropropene-1, or any other suitable, known, commercially available cure site monomers.

Intermediate Transfer Member Formation

The intermediate transfer member mixtures illustrated herein comprising, for example, a polyamic acid or a polyimide generated from the polyamic acid, a vinyl acetate crotonic acid copolymer, an optional fluoropolymer, an optional polysiloxane, and an optional conductive filler component, can be formulated into an intermediate transfer member by a number of suitable methods. For example, with known milling processes, uniform dispersions of the intermediate transfer member mixtures can be obtained, and then coated on individual metal substrates, such as a stainless steel substrate or the like, using known draw bar coating or flow coating methods. The resulting individual film or films can be cured and dried at high temperatures, such as by heating the films at from about 100° C. to about 400° C., or from about 160° C. to about 325° C., for a suitable period of time, such as from about 20 to about 180 minutes, from about 40 to about 120 minutes, and more specifically, cured at about 75° C. for about 30 minutes, then at about 190° C. for 30 minutes, and finally cured at about 320° C. for about 60 minutes, while remaining on the metal substrates.

After drying and cooling to room temperature, about 23° C. to about 25° C., the films self release from the steel substrates, that is the films release without any external assistance. The resultant intermediate transfer film product can have a thickness of, for example, from about 15 to about 150 microns, from about 20 to about 100 microns, from about 25 to about 75 microns, or from about 40 to about 50 microns.

As metal substrates selected for the deposition of the mixture disclosed herein, there can be selected stainless steel, aluminum, nickel, copper, and their alloys, glass plates, and other conventional typical known materials.

Examples of solvents selected for formation of the intermediate transfer member mixtures, which solvents can be selected in an amount of, for example, from about 60 to about 95 weight percent, or from about 70 to about 90 weight percent of the total mixture components weight include alkylene halides, such as methylene chloride, tetrahydrofuran, toluene, monochlorobenzene, N-methyl-2-pyrrolidone (NMP), N,N-dimethylformamide, N,N-dimethylacetamide, methyl ethyl ketone, dimethylsulfoxide (DMSO), methyl isobutyl ketone, formamide, acetone, ethyl acetate, cyclohexanone, acetanilide, mixtures thereof, and the like. Diluents can be mixed with the solvents selected for the intermediate transfer member mixtures. Examples of diluents added to the solvents in amounts of from about 1 to about 25 weight percent, and from 1 to about 10 weight percent based on the weight of the solvent, and the diluents are known diluents like aromatic hydrocarbons, ethyl acetate, acetone, cyclohexanone, and acetanilide.

The intermediate transfer members illustrated herein can be selected for a number of printing and copying systems, inclusive of xerographic printing systems. For example, the disclosed intermediate transfer members can be incorporated into a multi-imaging xerographic machine where each developed toner image to be transferred is formed on the imaging or photoconductive drum at an image forming station, and where each of these images is then developed at a developing station, and transferred to the intermediate transfer member. The images may be formed on a photoconductor and developed sequentially, and then transferred to the intermediate transfer member. In an alternative method, each image may be formed on the photoconductor or photoreceptor drum, developed, and then transferred in registration to the intermediate transfer member. In an embodiment, the multi-image system is a color copying system, wherein each color of an image being copied is formed on the photoreceptor drum, developed, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

Specific embodiments will now be described in detail. These examples are intended to be illustrative, and are not limited to the materials, conditions, or process parameters set forth in these embodiments. All parts are percentages by weight of total solids of all the components unless otherwise indicated. The viscosity values were determined by a viscometer.

COMPARATIVE EXAMPLE 1

A coating composition was prepared by stirring a mixture of special carbon black 4 obtained from Orion Chemicals, a polyimide of a polyamic acid of biphenyl tetracarboxylic dianhydride/diaminobenzene, commercially available as U-VARNISH® A and S (about 20 weight in NMP), both obtainable from UBE America Inc., New York, N.Y., or both also available from Kaneka Corporation, Texas, or a polyamic acid of pyromellitic dianhydride/4,4'-oxydianiline, commercially available from Industrial Summit technology Corporation, Parlin, N.J. with the trade name of PYRE-M.L.® RC-5019 or RC-5083, and the fluoropolymer NOVEC® FC-4432, a non-ionic polymeric fluorochemical surfactant available from the 3M Company, in a ratio of polyamic acid or polyimide/carbon black/fluoropolymer of 88.3/11.5/0.2 based on the initial mixture feed amounts, in N-methyl-2-pyrrolidone (NMP), about 16 weight solids. The obtained intermediate transfer member dispersion was coated on a stainless steel substrate of a thickness of 0.5 millimeter, and subsequently the mixture was cured by heating at 75° C. for 30 minutes, 190° C. for 30 minutes, and 320° C. for 60 minutes. The resulting intermediate transfer member comprised of the above components in the ratios indicated did not self release from the stainless substrate, but rather adhered to this substrate. After being immersed in water for 3 months, the intermediate transfer member obtained eventually self released from the substrate.

EXAMPLE I

There was prepared by admixing with stirring, a coating composition comprising special carbon black 4, obtained from Orion Chemicals, a polyimide of a polyamic acid of biphenyl tetracarboxylic dianhydride/diaminobenzene, commercially available as U-VARNISH A and S (about 20 weight in NMP), both available from UBE America Inc., New York, N.Y., or both also available from Kaneka Corporation, Texas, or a polyamic acid of pyromellitic dianhydride/4,4'-oxydianiline, commercially available from Industrial Summit Technology Corp., Parlin, N.J. with the trade name of PYRE-M.L.® RC-5019 or RC-5083, the Wacker Polymers Company vinyl acetate/crotonic acid copolymer VINNAPAS® C305, a solid, colorless to pale yellowish copolymer of vinyl acetate and crotonic acid, with an acid number of from about 30 to about 38 milligrams KOH/gram and the fluoropolymer NOVEC® FC-4432, a non-ionic polymeric fluorochemical surfactant available from the 3M Company, in a ratio of polyamic acid or polyimide/carbon black/vinyl acetate/crotonic acid copolymer/fluoropolymer of 87.2/11.5/1.1/0.2 were prepared in NMP, about 16.5 weight percent solids with Attritor milling for 6 hours. The obtained intermediate transfer member coating dispersion was coated on a stainless steel substrate of a thickness of 0.5 millimeter, and subsequently the mixture was cured by heating at 75° C. for 30 minutes, 190° C. for 30 minutes, and 320° C. for 60 minutes. The resulting intermediate transfer member, about 50 microns in thickness, was comprised of the above ingredients of special carbon black 4, the polyimide of the following formula/structure

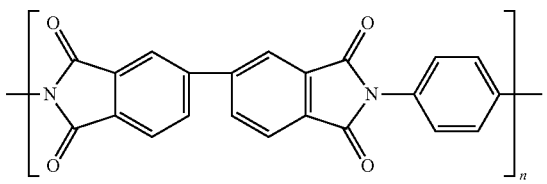

wherein n is equal to about 30, formed from the curing by heating of the intermediate containing mixture of the carbon black, the polyamic acid, the vinylacetate/crotonic acid copolymer, and the fluoropolymer in the ratios indicated, immediately self released from the stainless steel without the assistance of any external processes.

Example II

An intermediate transfer member is prepared by repeating the process of Example I except that the vinyl acetate/crotonic acid copolymer VINNAPAS® C305, with an acid number of from about 30 to about 38 milligrams KOH/gram, is replaced with the Wacker Polymers Company vinyl acetate/crotonic acid copolymer VINNAPAS® C341, a solid, colorless to pale yellowish copolymer of vinyl acetate and crotonic acid with an acid number of from about 6 to about 8 milligrams KOH/gram.

EXAMPLE III

An intermediate transfer member was prepared by repeating the process of Example I except that the vinyl acetate/crotonic acid copolymer VINNAPAS® C305, with an acid number of from about 30 to about 38 milligrams KOH/gram, was replaced with the Wacker Polymers Company vinyl acetate/crotonic acid copolymer VINNAPAS® C501, a solid, colorless to pale yellowish copolymer of vinyl acetate and crotonic acid, with an acid number of from about 5.5 to about 7 milligrams KOH/gram.

Measurements

The above intermediate transfer members of Examples I and III, and the Comparative Example 1 were measured for Young's Modulus and Break Strengths following the known ASTM D882-97 process. Samples (0.5 inch×12 inch) of each intermediate transfer member were placed in the Instron Tensile Tester measurement apparatus, and then the samples were elongated at a constant pull rate until breaking. During this time, there was recorded the resulting load versus the sample elongation. The Young's Modulus was calculated by taking any point tangential to the initial linear portion of the recorded curve results and dividing the tensile stress by the corresponding strain. The tensile stress was calculated by the load divided by the average cross sectional area of each of the test samples. The results are provided in Table 1. The surface resistivity of the above intermediate transfer members of Examples I and III, and Comparative Example 1 were also measured using a High Resistivity Meter, and the results are provided in Table 1.

TABLE 1

|  | Surface Resistivity (ohm/sq) | Young's Modulus (MPa) | Release Time from the Metal Substrate | Break Strength (MPa) |
| --- | --- | --- | --- | --- |
| Comparative Example 1 | $5.6 \times 10^{10}$ | 6,000 | Did not release; needed to be immersed in water for 3 months prior to being released. | 163 |
| Example I VINNAPAS ® C305 | $4.2 \times 10^{10}$ | 8,700 | Excellent; released in 10 seconds. | 225 |
| Example III VINNAPAS ® C501 | $3.8 \times 10^{10}$ | 8,550 | Excellent; released in 10 seconds. | 205 |

Incorporation of the vinyl acetate/crotonic acid copolymers into the above prepared intermediate transfer members had substantially no negative impacts on both the mechanical and electrical properties thereof, and no coating defects.

Also, the intermediate transfer members of Examples I and III self released quickly from the substrate without the need to apply an additional release layer on the stainless steel, while the Comparative Example 1 did not self release and remained on the stainless steel substrate, being released only after immersed in water for three months.

The Examples I, II and III intermediate transfer members were obtained at a lower cost, about 65 to about 75 percent lower than a number of known intermediate transfer members, such as those of Comparative Example 1, that were free of the vinyl acetate/crotonic acid copolymers in that the Examples I, II and III members do not require an added release layer coating on a stainless steel substrate when the members were initially prepared.

After being released from the stainless steel substrate, the Examples I, II and III intermediate transfer products obtained can be used as intermediate transfer members, or the products obtained can be coated on supporting substrates of a polymer like a polyamide.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member comprising a vinyl acetate crotonic acid copolymer, and a conductive component and wherein said vinyl acetate crotonic acid copolymer is represented by

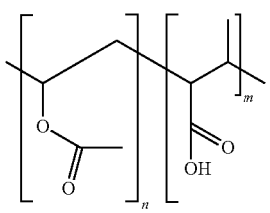

wherein n is from about 70 to about 99.9 mol percent, m is from about 0.1 to about 30 mol percent, and the total thereof is about 100 mol percent and wherein said intermediate transfer member is in the configuration of a single layer.

2. An intermediate transfer member in accordance with claim 1 further comprising a polyimide or a component that coverts to a polyimide, and a fluoropolymer.

3. An intermediate transfer member in accordance with claim 1 wherein n is from about 80 to about 99.5 mol percent, and m is from about 0.5 to about 20 mol percent.

4. An intermediate transfer member in accordance with claim 1 wherein said vinyl acetate crotonic acid copolymer possesses a weight average molecular weight of from about 20,000 to about 300,000, and a number average molecular weight of from about 5,000 to about 200,000.

5. An intermediate transfer member in accordance with claim 2 wherein the polyimide is a thermosetting polyimide, and wherein said member possesses a Young's Modulus of from about 4,000 to about 10,000 Mega Pascals and a break strength of from about 100 to about 300 Mega Pascals.

6. An intermediate transfer member in accordance with claim 2 wherein the polyimide is generated from curing at a temperature of from about 75° C. to about 325° C. a polyamic acid selected from the group consisting of a polyamic acid of biphenyl tetracarboxylic dianhydridediaminobenzene and a polyamic acid of pyromellitic dianhydride 4,4'-oxydianiline.

7. An intermediate transfer member in accordance with claim 6 wherein said curing is at about 75° C. for about 30 minutes, about 190° C. for about 30 minutes, and then at about 320° C. for about 60 minutes.

8. An intermediate transfer member in accordance with claim 2 wherein the component that coverts to a polyimide is selected from the group consisting of a a polyamic acid of pyromellitic dianhydride 4,4'-oxydianiline, a polyamic acid of pyromellitic dianhydridephenylenediamine, a polyamic acid of biphenyl tetracarboxylic dianhydride 4,4'-oxydianiline, a polyamic acid of biphenyl tetracarboxylic dianhydridephenylenediamine, a polyamic acid of benzophenone tetracarboxylic dianhydride 4,4'-oxydianiline, a polyamic acid of benzophenone tetracarboxylic dianhydride 4,4'-oxydianiline/phenylenediamine, and mixtures thereof.

9. An intermediate transfer member in accordance with claim 2 wherein said polyimide is selected from the group consisting of at least one of

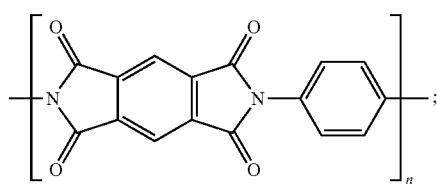

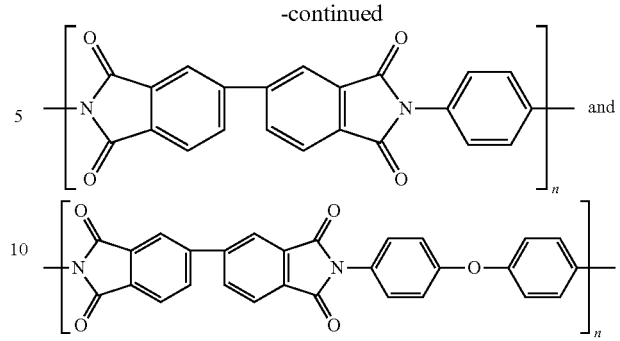

where n represents the number of repeating segments of from about 5 to about 3,000.

10. An intermediate transfer member in accordance with claim 9 where n is from about 20 to about 200.

11. An intermediate transfer member in accordance with claim 1 wherein the conductive component is carbon black.

12. An intermediate transfer member in accordance with claim 1 wherein the conductive component is a metal oxide, a polyaniline, or mixtures thereof.

13. An intermediate transfer member in accordance with claim 2 wherein said fluoropolymer is a fluoroacrylate copolymer.

14. An intermediate transfer member in accordance with claim 1 wherein said vinyl acetate crotonic acid copolymer is present in an amount of from about 0.1 to about 15 weight percent based on solids.

15. An intermediate transfer member in accordance with claim 1 wherein said vinyl acetate crotonic acid copolymer is present in an amount of from about 0.5 to about 5 weight percent based on solids.

16. An intermediate transfer member in accordance with claim 1 further including a polysiloxane copolymer of a polyether modified polydimethylsiloxane, a polyester modified polydimethylsiloxane, a polyacrylate modified polydimethylsiloxane, or a polyester polyether modified polydimethylsiloxane.

17. An intermediate transfer member in accordance with claim 2 wherein the polyimide is present in an amount of from about 70 to about 95 weight percent, the vinyl acetate crotonic acid copolymer is present in an amount of from about 0.1 to about 15 weight percent, the fluoropolymer is present in an amount of from about 0.05 to about 3 weight percent, and the conductive component is present in an amount of from about 3 to about 40 weight percent, with the total of ingredients being about 100 percent.

18. An intermediate transfer member comprising a mixture of a polyimide, a vinyl acetate crotonic acid copolymer, a carbon black conductive component, and a fluoropolymer, and wherein said vinyl acetate crotonic acid copolymer is represented by the following formula/structure

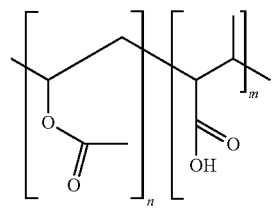

wherein n is from about 70 to about 99.9 mol percent, m is from about 0.1 to about 30 mol percent, and where the total thereof is about 100 mol percent and wherein said intermediate transfer member is in the configuration of a single layer.

19. An intermediate transfer member comprising a mixture of a polyimide or a polyamic acid that converts to a polyimide, a vinyl acetate crotonic acid copolymer, carbon black and a fluoropolymer, and wherein said vinyl acetate crotonic acid copolymer possesses a weight average molecular weight of from about 20,000 to about 300,000, and a number average molecular weight of from about 5,000 to about 200,000, and wherein said polyimide is selected from the group consisting of at least one of

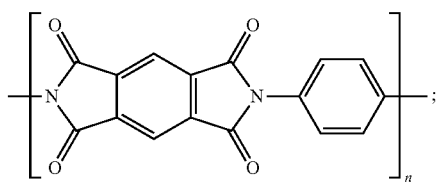

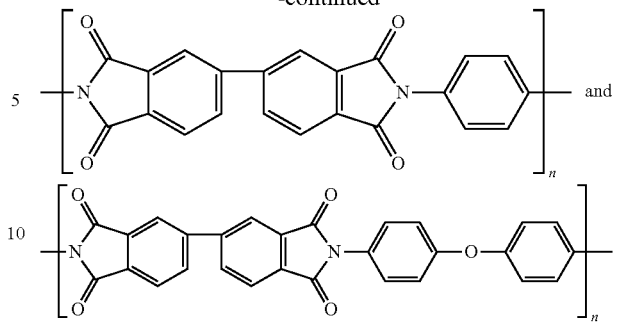

where n represents the number of repeating segments of from about 5 to about 3,000 percent and wherein said intermediate transfer member is in the configuration of a single layer.

20. An intermediate transfer member in accordance with claim 19 wherein said vinyl acetate crotonic acid copolymer is present in an amount of from about 0.1 to about 10 weight percent based on the solids present, and wherein said member possesses a Young's modulus of from about 5,500 to about 9,500 Mega Pascals and a break strength of from about 175 to about 255 Mega Pascals.

* * * * *